United States Patent Office 3,320,311
Patented May 16, 1967

3,320,311
N-CYCLOALKYLIDENE - N' - CYCLOALKYL-1-
ENYL-THIOUREAS AND METHOD OF PREP-
ARATION
Charanjit Rai, Crystal Lake, Ill., assignor, by mesne assignments, to Union Oil Company of California, Los Angeles, Calif., a corporation of California
No Drawing. Filed July 17, 1963, Ser. No. 295,794
13 Claims. (Cl. 260—552)

This invention relates to condensation products of cyclic ketones and substituted or unsubstituted thioureas and the process of producing such compounds.

It is known that urea and cyclohexanone react in the presence of a base in accordance with the equation

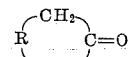

In accordance with this invention I have found that the reaction of cyclic ketones with thiourea or substituted thioureas gives different products and the reaction may be represented by the equations:

Equation 1

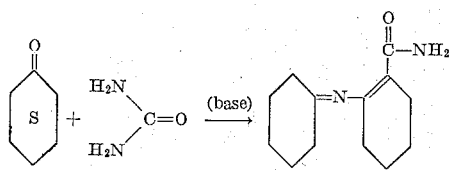

in either an acid or base catalyzed reaction and also where

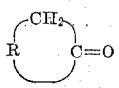

is substituted or unsubstituted cyclohexanone, the following reaction predominates:

Equation 2

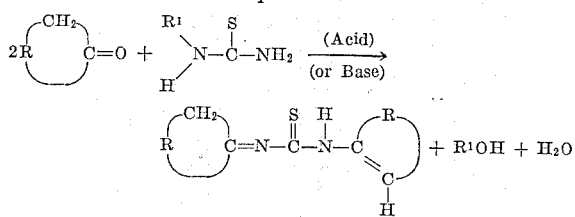

R in Equation 1 is a divalent radical of the group consisting of unsubstituted methylene chains of the formula —(CH$_2$)$_n$— wherein $n$ is 2 to 9, substituted methylene chains of the formula

wherein Y is a substituent of the group consisting of hydrogen, methyl, ethyl, propyl, butyl radicals, chlorine and fluorine. Also the beta carbon atom in the cyclic ketone

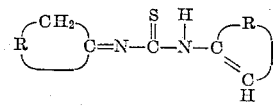

may have one hydrogen atom thereof substituted with a Y substituent. Where two or more Y substituents are present they may be the same or different members of the foregoing group. These same considerations apply to the —CH$_2$— units of cyclohexanone in Equation 2.

R$^1$ of the thiourea compound can be hydrogen or any C$_1$ to C$_{20}$ hydrocarbon substituent, and preferably is a substituent of the group consisting of hydrogen, C$_1$ to C$_4$ straight-chain or branched-chain aliphatic radicals such as methyl, propyl, isobutyl and t-butyl, aryl radicals having 6 to 18 cyclic carbon atoms, such as phenyl, naphthyl and anthryl, the corresponding C$_1$ to C$_4$ -alkyl substituted aryl radicals where the alkyl substituents are as heretofore defined and said aryl radicals can contain from 1 to 5 such substituents for phenyl radical, 1 to 7 such substituents for the naphthyl radical and 1 to 9 such substituents for the anthryl radical, for example the corresponding aralkyl radicals such as phenylmethyl, phenylethyl, naphthylmethyl and phenylbutyl and C$_3$ to C$_7$ cycloaliphatic radicals such as cyclopropyl, cyclobutyl and spiropentyl which are attached thereto as monovalent radicals or which are joined to adjacent carbon atoms to form a double ring system and the like.

Accordingly it is an object of this invention to provide a novel method of condensing cyclic ketones and thioureas and to prepare novel compounds having the formulae:

(I)

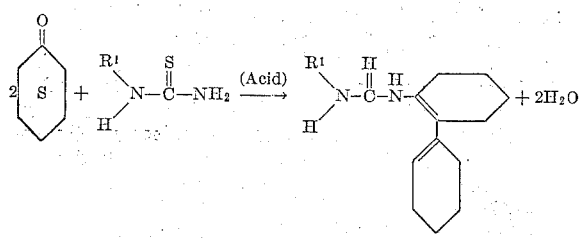

and (II)

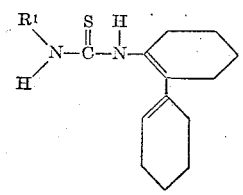

wherein R and R$^1$ are as previously defined to include the substituent Y on the methylene groups in each of the formulae.

Another object of this invention is to provide as new compounds N-cycloalkylidene-N'-cycloalkyl-1-enyl thioureas (Formula I) and the method of preparing such compounds. Another object of this invention is to provide as new compounds 2-cycloalkyl-1-enyl cycloalkyl-1-enyl-thioureas (Formula II) and the method of preparing such compounds.

A further object of this invention is to provide a N-cyclohexylidene-N'-cyclohexyl-1-enyl thiourea as a new composition of matter and the method of preparation thereof.

Still another object of this invention is to provide derivatives of the compounds herein disclosed.

And another object is to provide 2-cyclohex-1-enyl-cyclohex-1-enyl thiourea and the method of preparation thereof.

These and other objects of this invention will be described or become apparent as the specification proceeds.

The base-catalyzed condensation of cyclohexanone and thiourea has been found to produce two isomeric products having the emperical formula, $C_{13}H_{20}N_2S$, said isomeric mixture predominating in an isomer I (yellowish in color)

(I) 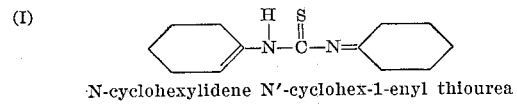

N-cyclohexylidene N'-cyclohex-1-enyl thiourea melting at about 218° C. and containing a small amount of an isomer II (II) 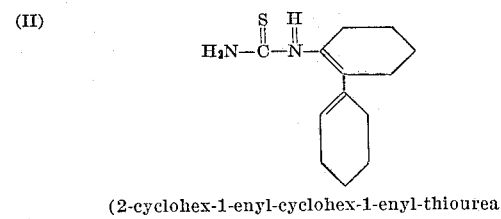

(2-cyclohex-1-enyl-cyclohex-1-enyl-thiourea (colorless) melting at 266° C. The isomer I on refluxing with hydrochloric acid gave isomer II. The higher melting isomer II was also formed by the acid-catalyzed condensation of thiourea with cyclohexanone in 72% yield.

In the presence of acids cyclohexanone is known to undergo self condensation to give 2-cyclohexylidene-cyclohexanone. When thiourea was condensed with 2-cyclohexylidene-cyclohexanone, so prepared, in the presence of hydrochloric acid, the isomer II resulted. The melting point of a mixture of the latter product with the previously prepared isomer II, remained undepressed and the infrared spectra of the two compounds were identical.

The similar base-catalyzed reactions of other cyclic ketones with thiourea gave products having infrared and ultraviolet spectra similar to the low melting isomer I, whereas the acid-catalyzed reactions of these ketones resulted in products similar to the high melting isomer II. However, the condensation of cycloheptanone and thiourea, whether catalyzed by a base or an acid, gave the same product, the low melting isomer, $C_{15}H_{24}N_2S$. When the condensation of 2-cyclohexylidene-cyclohexanone was carried out in the presence of a base, such as triethanolamine, the same product, $C_{13}H_{20}N_2S$, the higher melting isomer II, was isolated in somewhat lower yields.

Cyclohexanone exists in a keto and an enol form, the latter being present up to $2 \times 10^{-2}$ percent in the liquid state. It is suggested that the base-catalyzed reaction of cyclohexanone and thiourea proceeds through the enolic form and does not involve the intermediate of the acid-catalyzed reaction, 2 - cyclohexylidene - cyclohexanone. Two structures (I and III)

(I) 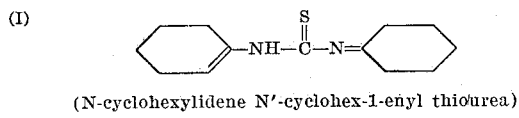

(N-cyclohexylidene N'-cyclohex-1-enyl thiourea)

(III) 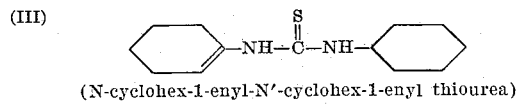

(N-cyclohex-1-enyl-N'-cyclohex-1-enyl thiourea)

were considered for the lower melting isomer I, from the base-catalyzed condensation of cyclohexanone and thiourea. The formation of dibromide, $C_{13}H_{20}N_2SBr_2$ on reaction with bromine suggested the presence of only one double bond. The infrared spectrum indicated the presence of NH stretching bands around 3225 cm.$^{-1}$ and 1546 cm.$^{-1}$, a C—H stretching and bending band at 3050 cm.$^{-1}$, a C=N band at 1585 cm.$^{-1}$ and C=S band at 1400 cm.$^{-1}$ and 1365 cm.$^{-1}$. The C=C band is generally weak and shows absorption at 1620 cm.$^{-1}$. A very weak band at 1685 cm.$^{-1}$ may be due to C=C. The ultraviolet spectrum of the compound shows absorption at 297 and 357 m$\mu$, and resembles the absorption spectrum of thioketones thereby supporting the presence of a C=S group. All this data points to structure I for the lower-melting isomer $C_{13}H_{20}N_2S$.

The condensations of 2-methylcyclohexanone, 3-methylcyclohexanone, and 4-methylcyclohexanone with thiourea were also studied in a basic medium. The resulting compounds were formed in low yields and their infrared spectra were similar to that of I. The ultraviolet spectra of these compounds gave absorption peaks, with $\lambda_{max.}$ at about 358 and 299 m$\mu$ as compared with that of compound I having $\lambda_{max.}$ at 357, and 297 m$\mu$. Their structures may be represented by I with the proper substituents on cyclohexyl and cyclohex-1-enyl rings. These compounds are shown in Tables I, III and V.

The base-catalyzed cycloheptanone and thiourea condensation resulted in the product, $C_{15}H_{24}N_2S$, which could also be prepared by the acid-catalyzed reaction in low yields. Cyclopentanone and thiourea condensation gave a viscous oil which did not crystallize and was not studied further.

The acid-catalyzed condensation product of thiourea with cyclohexanone or 2-cyclohexylidene-cyclohexanone may be represented by the following structures:

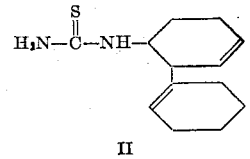

II (2-cyclohex-1-enyl-cyclohex-1-enyl thiourea)

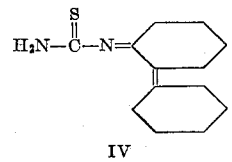

IV (2-cyclohexylidene-cyclohexylidene thiourea)

The formation of a tetrabromide, $C_{13}H_{20}N_2SBr_4$ indicated the presence of two double bonds in the molecule. The ultraviolet spectrum with $\lambda_{max.}$ values of 275 and 256 m$\mu$ supports structure II. This was confirmed further by the infrared spectrum of the compound. The absorptions at 3350, 3205 and 1554 cm.$^{-1}$ are due to N—H stretching and bending bands; the bands at 3075 cm.$^{-1}$ and 3060 cm.$^{-1}$ are probably due to the C—H stretching vibration and will only result from structure II. A strong band at 1690 cm.$^{-1}$ may be due to the absorption resulting from the conjugated double bonds of the molecule. Generally, conjugation in aliphatic compounds lowers the absorption frequency. The absorption peak in the region 1680–1670 cm.$^{-1}$ to $RR_1C=CHR_2$ and 1655–1645 cm.$^{-1}$ peak is assigned to $RR_1C=CH_2$ and peaks at 1690 cm.$^{-1}$ and 1645 are assigned to the bands of polymerized 2,3-dimethylbutadiene to the two types of double bonds. The absorption at 1365 cm.$^{-1}$ may be assigned to C=S[4]. The ultraviolet spectrum of the N-phenylthiourea derivative showed a $\lambda_{max.}$ at 264 m$\mu$.

The condensation of 2-methylcyclohexanone 3-methylcyclohexanone, and 4-methylcyclohexanone with thiourea was also studied in acidic medium. The new compounds thus prepared are listed in Tables II, IV and VI. 3-methylcyclohexanone and 4-methylcyclohexanone reacted with thiourea to give crystalline products but 2-methylcyclohexanone gave an oily product which was not investigated further. The infrared absorptions and ultraviolet absorptions indicated that the structures of the products are similar to that of compound II.

Structures I and II were further confirmed by NMR

A small portion, 1.5 g., of the crude product did not dissolve in warm ethanol. It was colorless and melted at 260–262°. After recrystallization from p-dioxane the melting point was 266°. This product was characterized as 2-cyclohex-1-enyl cyclohex-1-enyl thiourea, isomer II.

The compounds described in Table I were prepared by the general procedure described above for the preparation of N-cyclohexylidene-N'-cyclohex-1-enyl thiourea.

TABLE I.—BASE CATALYZED CONDENSATION PRODUCTS OF THIOUREA WITH CYCLIC KETONES

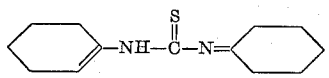

| Thiourea Type Reactant | Ketone Reactant | Condensation Product | | | Calcd. | | | | Found | | | |
|---|---|---|---|---|---|---|---|---|---|---|---|---|
| | | M.p., °C. | Yield percent | Formula | C | H | N | S | C | H | N | S |
| $H_2N\overset{S}{\overset{\|}{C}}-NH_2$ | Cyclohexanone | 218 | 48 | $C_{13}H_{20}N_2S$ | 66.10 | 8.48 | 11.86 | 13.56 | 66.05 | 8.95 | 11.65 | 13.35 |
| $C_6H_5NH-\overset{S}{\overset{\|}{C}}-NH_2$ | ----do---- | 210 | 15 | $C_{13}H_{20}N_2S$ | 66.10 | 8.48 | 11.86 | 13.56 | 66.20 | 9.00 | 11.30 | 13.50 |
| $CH_2=CH-NH-\overset{S}{\overset{\|}{C}}-NH_2$ | ----do---- | 220 | 10.2 | $C_{13}H_{20}N_2S$ | 66.10 | 8.48 | 11.86 | 13.56 | 66.50 | 9.20 | 11.10 | 13.20 |
| $H_2N\overset{S}{\overset{\|}{C}}-NH_2$ | 2-methyl-cyclohexanone | 203–204 | 9.56 | $C_{15}H_{24}N_2S$ | 68.18 | 9.09 | 10.61 | 12.12 | 67.80 | 9.90 | 10.20 | 12.40 |
| $H_2N\overset{S}{\overset{\|}{C}}-NH_2$ | 3-methyl-cyclohexanone | 225–226 | 12.2 | $C_{15}H_{24}N_2S$ | 68.18 | 9.09 | 10.61 | 12.12 | 68.30 | 9.60 | 10.25 | 11.85 |
| $H_2N\overset{S}{\overset{\|}{C}}-NH_2$ | 4-methyl-cyclohexanone | 246–248 | 15.0 | $C_{15}H_{24}N_2S$ | 68.18 | 9.09 | 10.61 | 12.12 | 68.20 | 9.80 | 10.10 | 11.90 |
| $H_2N-\overset{S}{\overset{\|}{C}}-NH_2$ | Cycloheptanone | 227–228 | 14.0 | $C_{15}H_{24}N_2S$ | 68.18 | 9.09 | 10.61 | 12.12 | 68.10 | 9.50 | 10.20 | 12.2 | spectra of the two isomers. The presence of vinylic proton peak at 5.5 p.p.m. and two broad bands consisting of several peaks at about 1.62 and 1.82 p.p.m. in the NMR spectrum of isomer I excluded structure III for the compound. The ratio of the —CH proton peak area to the —CH$_2$ proton peak area was 18 and could only arise from structure I having only one vinylic proton. The presence of a vinylic proton peak at 5.35 p.p.m. and two methylene proton peaks (one due to the hydrogens of the methylene groups unshielded by the diene system at 2.0 p.p.m. and the other due to the shielded hydrogen) at 1.6 p.p.m. in the NMR spectrum of compound II confirmed structure II for the isomer instead of structure IV. The NMR spectra were taken in chloroform.

In order to demonstrate the invention the following examples are given which confirm the operability of the process and the structures of the products.

All the melting points reported here are corrected and were determined in a capillary tube in the usual manner.

EXAMPLE I

*Preparation of N-cyclohexylidene N'-cyclohexyl-1-enyl thiourea (isomer I)*

Thiourea (19 g., 0.25 mole), cyclohexanone (50 g., 0.51 mole) and triethanolamine (5 g.) were mixed in a heated flask and refluxed for two hours. The reaction mixture was cooled and dissolved in warm aqueous ethanol (150 ml.) and allowed to cool whereupon a yellow precipitate appeared. The precipitate was filtered off and dried giving 26.4 g. of crude product, melting at 214–216°. On recrystallization from ethanol, the melting point of I increased to 218–219°.

EXAMPLE II

*Isomeriztaion of N-cyclohexylidene, N'-cyclohex-1-enyl thiourea with hydrochloric acid to 2-cyclohex-1-enyl cyclohex-1-enyl thiourea*

A mixture of N - cyclohexylidene-N'-cyclohex-1-enyl thiourea (2.0 g.) and 20% hydrochloric acid (20 ml.) was refluxed for 1½ hours. The product was cooled and filtered. The melting point of the residue was 256–58°. On recrystallization from p-dioxane the melting point was 262–264°. The mixed melting point of this product with the isomer II was undepressed, and the infrared spectrum of the two compounds was identical.

EXAMPLE III

*2-cyclohexylidene-cyclohexanone*

2-cyclohexylidene-cyclohexanone, B.P. 154–155° at 19 mm. $n_D^{20}$ 1.5070 was prepared in 71% yield by the method of Gault et al., Bull. Soc. Chim., France 12,952 (1945).

EXAMPLE IV

*Preparation of 2-cyclohex-1-enyl cyclohex-1-enyl thiourea from cyclohexanone*

Thiourea (12.8 g.; 0.168 mole), cyclohexanone (58.8 g., 0.6 mole) and concentrated hydrochloric acid (20 ml.) were refluxed together for one hour. A colorless crystalline product separated during refluxing. The product was cooled, filtered and the residue was washed with ethanol. The yield of the product was 43.4 g. (61.8%), M.P. 266° after recrystallization from p-dioxane.

All the compounds listed in Table II were prepared by the method described above for the preparation of 2-cyclohex-1-enyl cyclohex-1-enyl thiourea.

TABLE II.—ACID-CATALYZED CONDENSATION PRODUCTS OF THIOUREA WITH CYCLIC KETONES

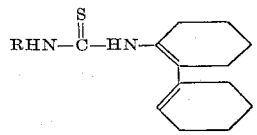

| R | Ketone Reactant | Condensation Product | | | Calcd. | | | | Found | | | |
|---|---|---|---|---|---|---|---|---|---|---|---|---|
| | | M.P., °C | Yield percent | Formula | C | H | N | S | C | H | N | S |
| H | Cyclohexanone | 266 | 72.1 | $C_{13}H_{20}N_2S$ | 66.10 | 8.48 | 11.86 | 13.56 | 66.10 | 8.90 | 11.65 | 13.35 |
| Phenyl | ___do___ | 160–61 | 32.8 | $C_{19}H_{24}N_2S$ | 73.05 | 7.75 | 8.95 | 10.25 | 73.10 | 7.80 | 9.00 | 10.10 |
| H | 4-Methyl-cyclohexanone | 194–195 | 18.2 | $C_{15}H_{24}N_2S$ | 68.18 | 9.09 | 10.61 | 12.12 | 68.20 | 9.30 | 10.45 | 12.05 |
| H | 3-Methyl-cyclohexanone | 186–87 | 16.4 | $C_{15}H_{24}N_2S$ | 68.18 | 9.09 | 10.61 | 12.12 | 68.05 | 9.35 | 10.50 | 12.10 |
| | Cycloheptanone* | 227–28 | 15.7 | $C_{15}H_{24}N_2S$ | 68.18 | 9.09 | 10.61 | 12.12 | 68.20 | 9.35 | 10.35 | 12.10 |
| H | 2-Cyclohexylidene-Cyclohexanone | 266 | 82.2 | $C_{13}H_{20}N_2S$ | 66.10 | 8.48 | 11.86 | 13.56 | 66.10 | 8.75 | 11.65 | 13.50 |

*The structure of the product from cycloheptanone is similar to the base catalyzed reaction products.

EXAMPLE V

*Preparation of 2-cyclohex-1-enyl cyclohex-1-enyl thiourea from 2-cyclohexylidene-cyclohexanone of Example III*

Method 1.—A mixture of thiourea (15.2 g., 9.2 mole), 2-cyclohexylidene-cyclohexanone (35.6 g., 0.2 mole) and concentrated hydrochloric acid (10 cc.) was refluxed for one hour, and a colorless crystalline solid precipitated. The solid was recovered by filtration and washed with ethanol. The yield was 34.1 g. (72%). The mixed melting point of this compound with compound II was undepressed and the infrared spectra of the two compounds were identical.

Method 2.—A mixture of thiourea (15.2 g., 0.2 mole), 2 cyclohexylidene-cyclohexanone (35.0 g., 0.2 mole) and triethanolamine (5 cc.) was refluxed for one hour when a slightly yellowish solid product separated. The latter was filtered and washed with ethanol; the yield was 29.3 g. (61.5%). The mixed melting point with compound II was undepressed and the infrared spectra of the two substances were identical.

EXAMPLE VI

The N-phenyl-N'-(2 - cyclohex-1-enyl cyclohex-1-enyl) thiourea was also prepared according to the method 1 of Example V.

EXAMPLE VII

*Preparation of N-cycloheptylidene N'-cyclohept-1-enyl thiourea*

Thiourea (7.6 g., 0.1 mole) cycloheptanone (22.4 g., 0.2 mole) and triethanolamine (5 cc.) were refluxed together for two hours. The viscous product was poured into warm aqueous ethanol and allowed to crystallize. The yellow crystals were obtained in a yield 4.0 g. (15.1%), M.P. 220°. On recrystallization from ethanol, the melting point rose to 227–228°.

When the above reaction was carried out in the presence of concentrated hydrochloric acid (10 cc.) instead of triethanolamine (5 cc.), the same product resulted, M.P. 227–228°, yield 2.5 g. (9.4%). The infrared spectra of both products were identical.

EXAMPLE VIII

*Methyliodide and ethyliodide derivatives of 2-cyclohex-1-enyl cyclohex-1-enyl thiourea, isomer II*

2-cyclohex-1-enyl cyclohex-1-enyl thiourea (5.9, 0.085 mole) and ethyl iodide (11.7 g., 0.038 mole) were heated together for one-half hour; the mixture was cooled and filtered and the solid was crystallized from EtOH, yield 9.2 g. (93%), M.P., 214–215°. Analysis calculated for $C_{13}H_{20}N_2S \cdot C_2H_5I$: C, 45.93; H, 6.38; I, 32.38, S, 8.2: N, 7.3%. Found C, 46.1; H, 7; I, 31.9; S, 8.2%, N, 7.2.

The methyl iodide derivative of isomer II was prepared similarly, M.P. 175°. Analysis calculated for $C_{13}H_{20}N_2S \cdot CH_3I$: C, 44.45; H, 6.08; I, 33.58%. Found: C, 43.9%; H, 6.7; I, 33.8%.

The methyl iodide derivative of N-cyclohexylidene N'-cyclohex-1-enyl thiourea was prepared according to the above procedure, M.P. 195–196°. Analysis calculated for $C_{13}H_{20}N_2S \cdot CH_3I$: C, 44.45; H, 6.08; I, 33.58%. Found: C, 44.04; H, 6.61; I, 33.11%.

EXAMPLE IX

*Action of bromine on $C_{13}H_{20}N_2S$, isomers I and II*

2-cyclohex-1-enyl cyclohex-1-enyl thiourea (5.9 g., 0.025 mole) and bromine (10 g.) dissolved in carbon tetrachloride (20 cc.) were warmed on a steam bath. A vigorous reaction took place with disappearance of the bromine and formation of a yellowish product, M.P. 156°, yield 10.29 g. (76%). Analysis calculated for $C_{13}H_{20}N_2SBr_4$: Br, 57.55%. Found: Br, 57.8%.

N-cyclohexylidene N'-cyclohex-1-enyl thiourea gave similarly a dibromide, $C_{13}H_{20}N_2SBr_2$, M.P. 142°. Analysis calculated for $C_{13}H_{20}N_2SBr_2$: Br, 40.37%. Found: Br, 41.1%.

Tables III and IV show the infrared and Tables V and VI the ultraviolet spectral data for these compounds and other compounds prepared by the procedures of this invention.

TABLE III.—INFRARED ABSORPTION BANDS (cm.$^{-1}$) BASE CATALYZED REACTION

| X | Stretching Modes, NH | Other Bands |
|---|---|---|
| H | 3235 | 3050 (CH), 1585 (C=C or C=N), 1546 (NH), 1405, 1365 (C=S). |
| 2-Methyl | 3250, 3145 | 1595 (C=C) 1560–1580 (C—N), 1530 (NH), 1400, 1370 (C=S). |
| 3-Methyl | 3380, 3200 | 3050 (CH), 2700, 1595 (C=C), 1580–1560 (C=N), 1545–1535 (NH), 1400, 1378, 1370 (C=S). |
| 4-Methyl | 3360, 3210, 3140 | 3000 (CH), 1595–1580 (C=C), and (C=N), 1540 (NH), 1405, 1378, 1368 (C=S). |
| Cycloheptanone | 3400, 3200, 3170 | 3050 (CH), 1585–1560 (C=C and C=N), 1545 (NH), 1400, 1355 (C=S). |

TABLE IV.—INFRARED ABSORPTION BANDS (cm.⁻¹), ACID CATALYZED REACTION

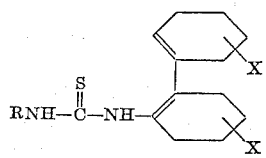

| R | X | Stretching Modes, N-H | |
|---|---|---|---|
| H | H | 3350, 3205 | 3075, 3060 (C-H), 1690 (>C=C—C=CH—), 1554 (NH), 1368 (C=S). |
| H | 3-Methyl | 3350, 3250, 3160 | 3000 (CH), 1680 (>C=C—C=CH—), 1630 (C=), 1610 (C=C), 1545 (NH) 1415, 1380 (C=S). |
| H | 4-Methyl | 3420, 3200 | 3075, 2970 (CH), 1695 (>C=C—C=CH—), 1565, 1550 (NH), 1365 (C=S). |
| Phenyl | H | 3400, 3300 | 3050 (CH), 1672 (>C=C—C=CH—), 1595 (aryl), 1510 (NH), 1366 (C=S). |
| H | H (EtI) | 3400 | 3050, 3000 (CH), 1635 (>C=C—C=CH), 1550 (NH), 1435, 1372 (C=S). |
| H | H (tetrabromide) | 3400, 3195 | 1550 (NH), 1365 (C=S). |

TABLE V.—ULTRAVIOLET ABSORPTION BANDS OF BASE CATALYZED CONDENSATION PRODUCTS FROM THIOUREA AND CYCLIC KETONES.

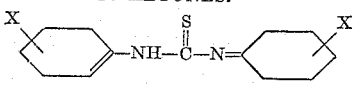

| | λMax. | εMax. |
|---|---|---|
| H | 357 | 6,709 |
| | 297 | 4,804 |
| | 215 | (¹) |
| H (Methyl iodide derivative) | 364 | 7,976 |
| | 267 | 5,160 |
| | 220 | 16,349 |
| 2-Methyl | 360 | 8,335 |
| | 299 | 10,070 |
| | 215 | (¹) |
| 3-Methyl | 358 | 10,000 |
| | 298 | 6,380 |
| | 215 | (¹) |
| 4-Methyl | 354 | 5,480 |
| | 299 | 3,830 |
| | 215 | (¹) |
| Cycloheptanone derivative | 685 | 6,127 |
| | 363 | 12,970 |
| | 295.5 | 6,908 |
| | 215 | (¹) |

¹ End absorption.

TABLE VI.—ULTRAVIOLET ABSORPTION BANDS OF ACID CATALYZED CONDENSATION PRODUCTS FROM THIOUREA AND CYCLIC KETONES

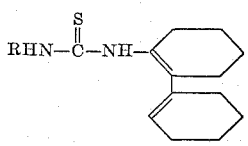

| R | X | Max. | Max. |
|---|---|---|---|
| H | H | 275 | 7,906 |
| | | 256 | 8,811 |
| | | 220 | 3,343 |
| H | H (Ethyl iodide derivative) | 287 | 3,393 |
| | | 220 | 15,337 |
| C₆H₅ | H | 264 | 12,150 |
| | | 215 | (¹) |
| H | 3-Methyl | 243 | 16,896 |
| | | 215 | (¹) |
| H | 4-Methyl | 254.5 | 13,904 |
| | | 215 | (¹) |

¹ End absorption.

The foregoing data establishes the structural relationship of the products prepared by the acid and base catalyzed reactions of this invention.

The compounds of this invention are useful as corrosion inhibitors, as chemical intermediates, as pharmaceuticals and as pesticides. The compounds are also useful as dyes or in the preparation of dyes.

The thiourea compound used in the reaction of this invention may be any compound of the formula

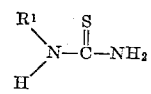

wherein $R^1$ is as previously defined to include hydrogen, any $C_1$ to $C_{20}$ or higher molecular weight hydrocarbon group or substituted hydrocarbon group which is stable under the reaction conditions and which does not interfere with the reaction. Examples of such hydrocarbon groups are methyl, ethyl, propyl, isopropyl, butyl, isobutyl, t-butyl, phenyl, naphthyl, anthryl, phenanthryl, radicals derived from triphenylene and naphthacene, methyl phenyl, ethylphenyl, propylphenyl, butylphenyl, t-butylphenyl, methylnaphthyl, ethylnaphthyl, methylanthryl, the corresponding aralkyl radicals including in addition to those already disclosed, phenylpropyl, naphthylpropyl, naphthylbutyl, and such other cycloaliphatic radicals as cyclopentyl, cyclohexyl and cycloheptyl. Various substituents such as hydroxyl, halo, particularly fluoro and alkoxy (having 1 to 4 carbon atoms) may be present in $R^1$ as long as same do not interfere with the reactions.

Species of thiourea compounds include thiourea, methyl thiourea, ethyl thiourea, N-phenyl thiourea, propyl thiourea, N-(O-tolyl) thiourea, N-(M-tolyl) thiourea, N-(P-tolyl) thiourea, and the like. Thiourea compounds not having an —NH₂ group will not work in the reaction.

The cyclic ketones used to prepare the products of this invention can be any compound having the structure

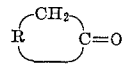

wherein R is a divalent radical which may consist of unsubstituted methylene chains of 2 to 9 carbon atoms, i.e., —$(CH_2)_n$—, where $n$ is 2 to 9, or substituted methylene chains of 2 to 9 carbon atoms containing substituents of the group consisting of methyl, ethyl, propyl, butyl, chloro and fluoro, as previously defined provided no more than one substituent is attached to any methylene group and preferably wherein one beta carbon atom in the formula is unsubstituted.

Examples of R include

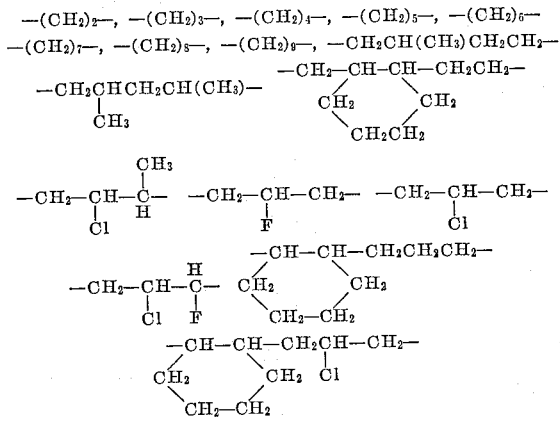

and similar structures.

The condensation reaction of this invention may be conducted at a temperature of about 150° C. and is preferably carried out at a temperature of about 150° to 200° C. or the reflux temperature of the reaction mixture. Although the mole ratios of reactants is not critical it is preferred that about 1.0 mole of thiourea be reacted with about 2.0 moles of the cyclic ketone. The reactants can be added or mixed in any order.

Any mineral acid or strong organic acid can be used to conduct the acid catalyzed reaction. The mineral acids include, for example and without limitation, the haloacids (HCL, HI, HBr and HF), sulfuric acid (concentrated) nitric acid (dilute), phorsphoric acid (ortho or meta) and boric acid. The organic acids include strong sulfonic acids, halo-organic acids, such as trichloroacetic acid and the like. The acids are used in dilute or concentrated form.

The base catalyzed reaction is conducted at a temperature of about 150° C. to 250° C. and preferably at 150° C. or the reflux temperature of the reaction mixture. Any alkaline material can be used as the catalyst to include both inorganic and organic bases such as alkali metal hydroxides, sodium, potassium, lithium, and cesium hydroxides, alkaline earth metal hydroxides and oxides such as calcium oxide or hydroxide, barium oxide or hydroxide or the octahydrate, etc. Organic bases include the aliphatic and aromatic amines, i.e., triethanolamine, diethanolamine, propylamine, aniline, methylamine and pyridine. The amount of catalyst used is subject to variation and an excess of catalyst does not appear to interfere with the reaction. An excess of acid catalyst appears to increase the yields. The amount of catalyst used for best results can be determined by experiments. In general about 3 to 8 cc. of an amine such as triethanolamine per mole of the cyclic ketone and about 10 to 50 cc. of concentrated hydrochloric acid per mole of cyclic ketone is used. Adjustments in these amounts of catalyst to accommodate the properties of a particular acid or base are within the skill of the art.

No special precautions are necessary in carrying out either the base or acid catalyzed reaction. The reaction mixture is taken up in a solvent, after a reaction time of 1 to 10 hours, the solvent being any liquid aliphatic (ethanol, propanol, etc.) alcohol or ketone. Other solvents such as hexane, benzene, toluene, xylene, dioxane, dimethylsulfoxide and the like may be used.

The embodiments of the invention in which an exclusive property or privilege is claimed are defined as follows:

I claim:
1. A compound of the formula

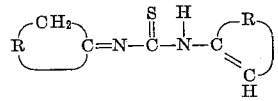

wherein R is a substituted or unsubstituted methylene chain of the formula —$(CH_2)_n$—, wherein $n$ is 2 to 5, said substituents consisting of up to three members of the group consisting of methyl, ethyl, propyl, butyl, chloro, and fluoro.

2. A compound in accordance with claim 1 in which R is a divalent unsubstituted methylene chain of the formula —$(CH_2)_n$— wherein $n$ is 2 to 5.

3. A compound in accordance with claim 2 in which $n$ is 4.

4. A compound in accordance with claim 2 in which $n$ is 5.

5. A compound in accordance with claim 1 in which R is a substituted methylene chain of the formula —$(CH_2)_n$—, wherein $n$ is 2 to 5, said substituents consisting of up to three members of the group consisting of methyl, ethyl, propyl, butyl, chloro, and fluoro.

6. A compound in accordance with claim 5 in which Y is methyl.

7. The method of preparing compounds of the formula

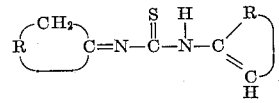

which comprises reacting about 2 moles of a cyclic ketone of the formula

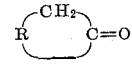

wherein R is a substituted or unsubstituted methylene chain of the formula —$(CH_2)_n$—, wherein $n$ is 2 to 4, said substituents consisting of up to three members of the group consisting of methyl, ethyl, propyl, butyl, chloro, and fluoro, with about 1 mole of a thiourea compound having at least three unsubstituted hydrogen atoms attached to the nitrogen atoms in the presence of a base catalyst.

8. The method in accordance with claim 7 in which said reaction is conducted at a temperature of about 150° C. to 250° C. and the catalyst is triethanolamine.

9. The method in accordance with claim 8 in which said thiourea compound is a member of the group consisting of thiourea, methylthiourea, ethylthiourea, N-phenylthiourea, propylthiourea, N-(o-tolyl) thiourea, N-(m-tolyl) thiourea and N-(p-tolyl)thiourea.

10. The reaction product of the compound of claim 1 with a compound selected from the group consisting of methyl iodide, ethyl iodide, dibromide and tetrabromide.

11. The method of preparing compounds of the formula

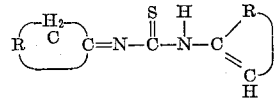

where comprises reacting about 2 moles of the corresponding cycloheptanone of the formula

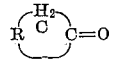

wherein R is a substituted or unsubstituted methylene chain of the formula —$(CH_2)_n$—, wherein $n$ is 5, said substituents consisting of up to three members of the group consisting of methyl, ethyl, propyl, butyl, chloro, and fluoro, with about 1 mole of a thiourea compound having at least three unsubstituted hydrogen atoms attached to the nitrogen atoms in the presence of a catalyst selected from the group consisting of an acid and a base.

12. The method in accordance with claim 11 in which said thiourea compound is a member selected from the group consisting of thiourea, methylthiourea, ethylthiourea, N-phenylthiourea, propylthiourea, N-(o-tolyl) thiourea, N-(m-tolyl) thiourea and N-(p-tolyl) thiourea.

13. The method in accordance with claim 11 in which the catalyst is hydrochloric acid.

References Cited by the Examiner

UNITED STATES PATENTS 2,948,752   8/1960   Podesva et al. _____ 260—552

OTHER REFERENCES

Podesva et al. Canadian Journal of Chemistry, vol. 40, No. 7 (July 1962), pp. 1403–07.

ALEX MAZEL, *Primary Examiner.*

HENRY R. JILES, *Examiner.*

JOSEPH A. NARCAVAGE, *Assistant Examiner.*